United States Patent
Skaff et al.

(10) Patent No.: US 10,565,548 B2
(45) Date of Patent: Feb. 18, 2020

(54) PLANOGRAM ASSISTED INVENTORY SYSTEM AND METHOD

(71) Applicant: Bossa Nova Robotics IP, Inc., Pittsburgh, PA (US)

(72) Inventors: Sarjoun Skaff, Pittsburgh, PA (US); Jonathan Davis Taylor, Pittsburgh, PA (US); Stephen Vincent Williams, Pittsburgh, PA (US); Simant Dube, Berkeley, CA (US)

(73) Assignee: BOSSA NOVA ROBOTICS IP, INC., Pittsburgh, PA (US)

( * ) Notice: Subject to any disclaimer, the term of this patent is extended or adjusted under 35 U.S.C. 154(b) by 166 days.

(21) Appl. No.: 15/471,813

(22) Filed: Mar. 28, 2017

(65) Prior Publication Data

US 2017/0286773 A1 Oct. 5, 2017

Related U.S. Application Data

(60) Provisional application No. 62/314,785, filed on Mar. 29, 2016, provisional application No. 62/427,509, filed on Nov. 29, 2016.

(51) Int. Cl.
| | |
|---|---|
| *G06Q 10/08* | (2012.01) |
| *G06K 9/62* | (2006.01) |
| *G06N 20/00* | (2019.01) |
| *B25J 19/02* | (2006.01) |
| *G05B 19/048* | (2006.01) |

(Continued)

(52) U.S. Cl.
CPC .......... *G06Q 10/087* (2013.01); *B25J 19/022* (2013.01); *G05B 19/048* (2013.01); *G06K 9/00664* (2013.01); *G06K 9/4642* (2013.01); *G06K 9/6202* (2013.01); *G06K 9/6267* (2013.01); *G06N 20/00* (2019.01); *H04N 5/23238* (2013.01); *G05B 2219/39046* (2013.01); *G06K 9/627* (2013.01)

(58) Field of Classification Search
CPC .. G06Q 10/087; G06Q 10/06; G06Q 10/0639; G06Q 10/08; G06N 20/00; B25J 19/022; G05B 19/048; G06K 9/00664; G06K 9/4642; G06K 9/6202; G06K 9/6267; G06K 9/00771; G06K 9/6218; G06K 9/3241; G06K 9/46; G06K 9/4604; G06K 9/32; G06K 9/3233; H04N 5/23238; H04N 5/23222; H04N 5/265; H04N 5/23299; G06T 2207/30108; G06T 7/0004; G06T 7/10–11; G06T 3/20
See application file for complete search history.

(56) References Cited

U.S. PATENT DOCUMENTS

| | | | |
|---|---|---|---|
| 8,189,855 B2 * | 5/2012 | Opalach | G06Q 10/087 382/100 |
| 8,508,527 B2 * | 8/2013 | Jeong | G05D 1/0246 345/418 |

(Continued)

*Primary Examiner* — Michael S Osinski
(74) *Attorney, Agent, or Firm* — David R. Stevens; Stevens Law Group

(57) ABSTRACT

A manually assisted robot inventory monitoring method provides for detecting and reading shelf labels using an autonomous robot. Bounding boxes around possible products in a panoramic image can be taken with at least one camera associated with the autonomous robot. Products in the bounding boxes are automatically identified, with those that are not being later manually identified.

17 Claims, 7 Drawing Sheets

US 10,565,548 B2
Page 2

(51) Int. Cl.
 *G06K 9/00* (2006.01)
 *G06K 9/46* (2006.01)
 *H04N 5/232* (2006.01)

(56) References Cited

U.S. PATENT DOCUMENTS

| | | | |
|---|---|---|---|
| 9,015,072 B2* | 4/2015 | Wu | G06Q 10/087 705/28 |
| 9,076,042 B2* | 7/2015 | Saptharishi | G06K 9/00771 |
| 9,097,800 B1 | 8/2015 | Zhu | |
| 9,373,057 B1* | 6/2016 | Erhan | G06K 9/6202 |
| 9,984,451 B2* | 5/2018 | Gormish | G06K 9/52 |
| 2008/0077511 A1 | 3/2008 | Zimmerman | |
| 2009/0059270 A1 | 3/2009 | Opalach et al. | |
| 2009/0060259 A1* | 3/2009 | Goncalves | A47F 9/047 382/100 |
| 2009/0063307 A1 | 3/2009 | Groenovelt et al. | |
| 2009/0094140 A1 | 4/2009 | Kwan | |
| 2009/0192921 A1* | 7/2009 | Hicks | G06F 3/0312 705/28 |
| 2010/0065634 A1* | 3/2010 | Nakamura | G06Q 30/0603 235/385 |
| 2012/0323620 A1* | 12/2012 | Hofman | G06Q 10/06 705/7.11 |
| 2013/0182114 A1 | 4/2013 | Zhang et al. | |
| 2014/0003655 A1 | 1/2014 | Gopalakrishnan et al. | |
| 2014/0003727 A1* | 1/2014 | Lortz | G06Q 10/087 382/218 |
| 2015/0052027 A1* | 2/2015 | Pavani | G06Q 10/087 705/28 |
| 2015/0117788 A1* | 4/2015 | Patel | G06K 9/4604 382/199 |
| 2015/0139536 A1 | 5/2015 | Jin et al. | |
| 2015/0162048 A1* | 6/2015 | Hirata | H04N 5/2258 386/337 |
| 2015/0193909 A1* | 7/2015 | Maayan | G06T 3/40 345/648 |
| 2015/0248592 A1* | 9/2015 | Wang | G06K 9/4619 382/201 |
| 2015/0363758 A1 | 12/2015 | Wu et al. | |
| 2016/0027159 A1* | 1/2016 | Amirghodsi | G06T 5/30 382/195 |
| 2016/0180533 A1 | 3/2016 | Pavani et al. | |
| 2016/0119540 A1* | 4/2016 | Wu | H04N 5/23238 348/38 |
| 2016/0171429 A1* | 6/2016 | Schwartz | G06K 9/00201 382/103 |
| 2016/0309082 A1* | 10/2016 | Maayan | G06T 3/40 |
| 2017/0032311 A1* | 2/2017 | Rizzolo | G06Q 20/201 |
| 2017/0178310 A1* | 6/2017 | Gormish | G06K 9/52 |
| 2017/0178372 A1* | 6/2017 | Gormish | G06T 11/60 |
| 2017/0193324 A1* | 7/2017 | Chen | G06K 9/3241 |
| 2017/0193434 A1* | 7/2017 | Shah | G06K 9/00664 |
| 2017/0286805 A1* | 10/2017 | Yu | G06K 9/3258 |
| 2017/0286901 A1* | 10/2017 | Skaff | G06Q 10/087 |
| 2018/0005176 A1* | 1/2018 | Williams | G06Q 10/087 |
| 2018/0108134 A1* | 4/2018 | Venable | G06K 9/00771 |
| 2018/0218494 A1* | 8/2018 | Chaubard | G06T 7/0008 |
| 2018/0260772 A1* | 9/2018 | Chaubard | G06Q 10/087 |
| 2019/0019293 A1* | 1/2019 | Woodroffe | G06T 7/13 |
| 2019/0034864 A1* | 1/2019 | Skaff | G06Q 10/087 |
| 2019/0057588 A1* | 2/2019 | Savvides | G08B 13/19604 |
| 2019/0156275 A1* | 5/2019 | Fisher | G06K 9/4628 |
| 2019/0215420 A1* | 7/2019 | Kaneko | G06T 3/4038 |

\* cited by examiner

PLANOGRAM ASSISTED INVENTORY SYSTEM AND METHOD

CROSS-REFERENCE TO RELATED PATENT APPLICATION

The present disclosure is part of a non-provisional patent application claiming the priority benefit of U.S. Patent Application No. 62/314,785, "System and Method for Locating, Identifying and Counting Products on Shelves", filed Mar. 29, 2016; and U.S. Patent Application No. 62/427,509, "System and Method for Locating, Identifying and Counting Items", filed Nov. 29, 2016.

TECHNICAL FIELD

The present disclosure relates generally to retail or warehouse product inventory systems that use a planogram. The planogram can be updated using an autonomous robot with an image capture system and onboard processing to provide near real time product tracking.

BACKGROUND

Retail stores or warehouses can have thousands of distinct products that are often sold, removed, added, or repositioned. Even with frequent restocking schedules, products assumed to be in stock may be out of stock, decreasing both sales and customer satisfaction. Point of sales data can be used to roughly estimate product availability, but does not help with identifying misplaced, stolen, or damaged products, all of which can reduce product availability. Manually monitoring product inventory and tracking product position is possible, but can be expensive and time consuming.

SUMMARY

A low cost, accurate, and scalable camera system for product or other inventory monitoring can include a movable base. Multiple cameras supported by the movable base are directable toward shelves or other systems for holding products or inventory. A processing module is connected to the multiple cameras and able to construct from the camera derived images an updateable map of product or inventory position.

In some embodiments, the described camera system for inventory monitoring can be used for detecting shelf labels; optionally comparing shelf labels to a depth map; defining a product bounding box; associating the bounding box to a shelf label to build a training data set; and using the training data set to train a product classifier.

In other embodiments, a system for building a product library can include an image capture unit operated to provide images of items. The system also includes a shelf label detector (which can be a high resolution zoomable camera) and optionally depth map creation unit (which can be provided by laser scanning, time-of-flight range sensing, or stereo imaging), a processing module to optionally compare detected shelf labels to a depth map, define a product bounding box, and associate the bounding box with a shelf label to build a training data set or learn image descriptors. Both the image capture unit and processing module can be mounted on an autonomous robot.

Because it represents reality on the shelf, an inventory map such as disclosed herein can be known as a "realogram" to distinguish from conventional "planograms" that take the form of 3D models, cartoons, diagrams or lists that show how and where specific retail products and signage should be placed on shelves or displays. Realograms can be locally stored with a data storage module connected to the processing module. A communication module can be connected to the processing module to transfer realogram data to remote locations, including store servers or other supported camera systems, and additionally receive inventory information including planograms to aid in realogram construction. In addition to realogram mapping, this system can be used to detect out of stock products, estimate depleted products, estimate amount of products including in stacked piles, estimate products heights, lengths and widths, build 3D models of products, determine products' positions and orientations, determine whether one or more products are in disorganized on-shelf presentation that requires corrective action such as facing or zoning operations, estimate freshness of products such as produce, estimate quality of products including packaging integrity, locate products, including at home locations, secondary locations, top stock, bottom stock, and in the backroom, detect a misplaced product event (also known as a plug), identify misplaced products, estimate or count the number of product facings, compare the number of product facings to the planogram, locate labels, determine sequence of labels, detect label type, read label content, including product name, barcode, UPC code and pricing, detect missing labels, compare label locations to the planogram, compare product locations to the planogram, determine the expiration date of products, determine freshness of products including produce, measure shelf height, shelf depth, shelf width and section width, recognize signage, detect promotional material, including displays, signage, and features and measure their bring up and down times, detect and recognize seasonal and promotional products and displays such as product islands and features, capture images of individual products and groups of products and fixtures such as entire aisles, shelf sections, specific products on an aisle, and product displays and islands, capture 360-deg and spherical views of the environment to be visualized in a virtual tour application allowing for virtual walk throughs, capture 3D images of the environment to be viewed in augmented or virtual reality, capture environmental conditions including ambient light levels, capture information about the environment including measuring space compliance with disability and safety standards and determining if light bulbs are off, provide a real-time video feed of the space to remote monitors, provide on-demand images and videos of specific locations, including in live or scheduled settings, and build a library of product images.

In one embodiment, the movable base can be a manually pushed or guidable cart. Alternatively, the movable base can be a tele-operated robot, or in preferred embodiments, an autonomous robot capable of guiding itself through a store or warehouse. Depending on size of the store or warehouse, multiple autonomous robots can be used. Aisles can be regularly inspected to identify out of stocks or create realograms, with aisles having high product movement being inspected more often.

In another embodiment, an inventory monitoring method includes the steps of allowing an autonomous robot to move along an aisle that is lined with shelves capable of holding inventory or products, with the autonomous robot acting as a movable base for multiple cameras. Multiple cameras are directed toward inventory on the shelf lined aisle, with data derived at least in part from these cameras being used to construct a realogram of inventory or a panoramic image using a processing module contained in the autonomous robot. Realogram data or panoramic images created by the processing module can be transferred to remote locations using a communication module, and inventory information received via the communication module can be used to aid in realogram construction.

In yet another embodiment, an inventory monitoring method, includes the steps of allowing an autonomous robot to move along a shelf lined aisle holding inventory, with the autonomous robot acting as a movable base for multiple cameras. The autonomous robot can maintain a substantially constant or tightly controlled distance from the shelf lined aisle holding inventory while moving in a forward or reverse direction. Using the multiple cameras directed toward inventory on the shelf lined aisle, at least part of a realogram of inventory positioned along a shelf lined aisle holding inventory can be constructed. Typically, the realogram is created and updated with a locally sited data storage and a processing module contained in the autonomous robot. To ensure complete or near complete camera coverage of shelf lined aisles, the autonomous robot can pause, reverse, or mark for further multiple camera inspection if data capture for a portion of the shelf lined aisle is incomplete.

DETAILED DESCRIPTION

Figure 1:
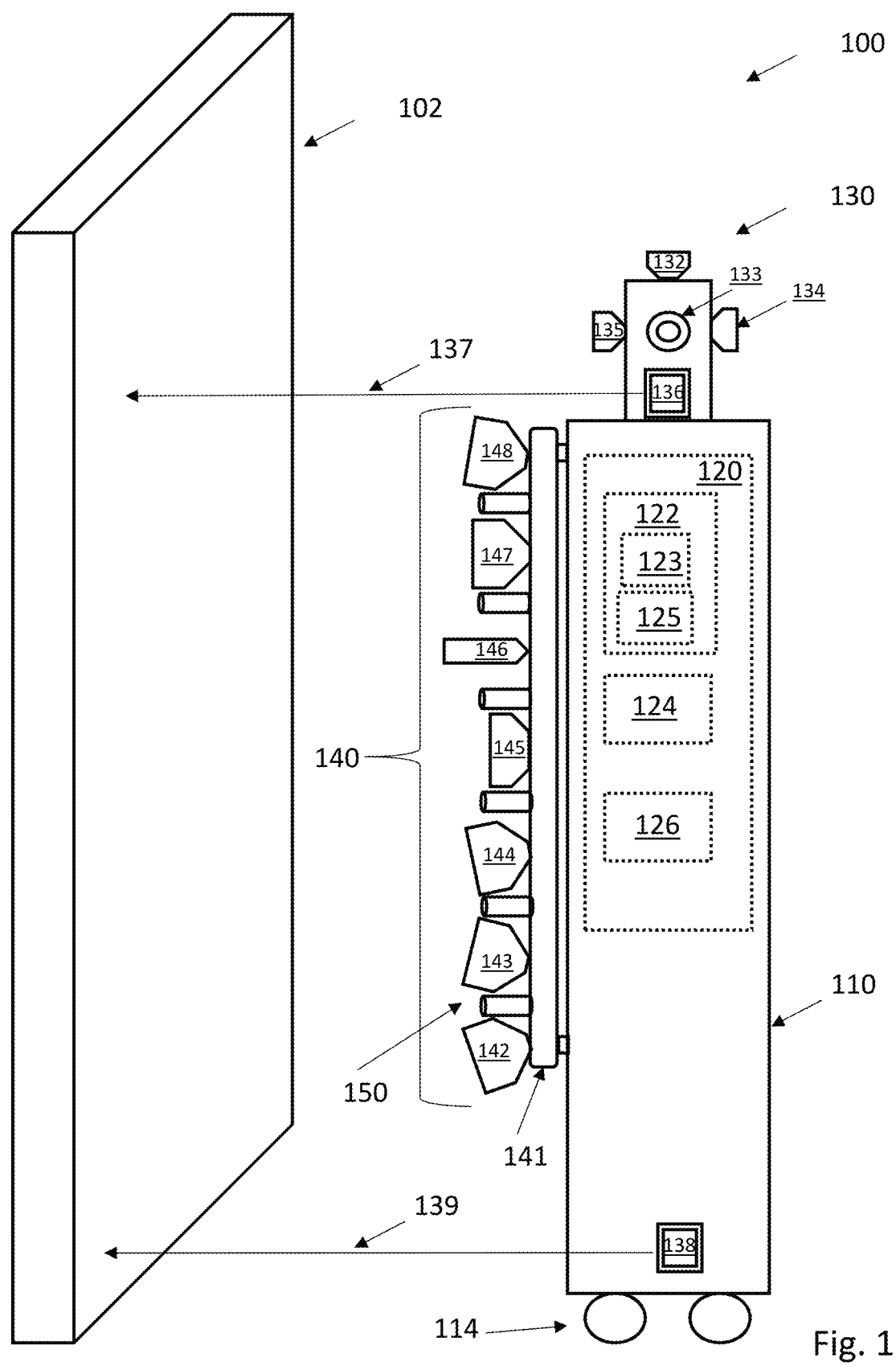
FIG. 1 is an illustration of a camera system mounted on a movable base to track product changes in aisle shelves or other suitable targets.

FIG. 1 is an illustration of an inventory monitoring camera system 100 mounted on a movable base 110 (with drive wheels 114) to track product changes in aisle shelves or other targets 102 without requiring an initial planogram.

The movable base 110 can be an autonomous robot having a navigation and object sensing suite 130 that is capable of independently navigating and moving throughout a building. The autonomous robot has multiple cameras 140 attached to movable base 110 by a vertically extending camera support 140. Lights 150 are positioned to direct light toward target 102. The object sensing suite includes forward (133), side (134 and 135), top (132) and/or rear (not shown) image and depth sensors to aid in object detection, localization, and navigation. Additional sensors such as laser ranging units 136 and 138 (and respective laser scanning beams 137 and 139) also form a part of the sensor suite that is useful for accurate distance determination. In certain embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

As seen in FIG. 1, various representative camera types useful for constructing an updatable realogram are shown. As previously noted, a realogram can use camera derived images to produce an updateable map of product or inventory position. Typically, one or more shelf units (e.g. target 102) would be imaged by a diverse set of camera types, including downwardly (142 and 144) or upwardly (143 and 148) fixed focal length cameras that cover a defined field less than the whole of a target shelf unit; a variable focus camera that adapts its focus to the distance from the imaged target; a wide field camera 145 to provide greater photographic coverage than the fixed focal length cameras; and a narrow field, zoomable telephoto 146 to capture bar codes, product identification numbers, and shelf labels. Alternatively, a high resolution, tilt controllable, height adjustable camera can be used to identify shelf labels. These camera 140 derived images can be stitched together, with products in the images identified, and position determined.

To simplify image processing and provide accurate results, the multiple cameras are typically positioned a set distance from the shelves during the inspection process. The shelves can be illuminated with LED or other directable lights 150 positioned on or near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, or level with respect to the camera support and the shelves. This advantageously permits a reduction in glare from products having highly reflective surfaces, since multiple cameras pointed in slightly different directions can result in at least one image with little or no glare.

Electronic control unit 120 contains an autonomous robot sensing and navigation control module 124 that manages robot responses. Robot position localization may utilize external markers and fiducials, or rely solely on localization information provided by robot-mounted sensors. Sensors for position determination include previously noted imaging, optical, ultrasonic sonar, radar, Lidar, Time of Flight, structured light, or other means of measuring distance between the robot and the environment, or incremental distance traveled by the mobile base, using techniques that include but are not limited to triangulation, visual flow, visual odometry and wheel odometry.

Electronic control unit 120 also provides image processing using a camera control and data processing module 122. Autonomous robot sensing and navigation control module 124 manages robot responses, and communication module 126 manages data input and output. The camera control and data processing module 122 can include a separate data storage module 123 (e.g. solid state hard drives) connected to a processing module 125. The communication module 126 is connected to the processing module 125 to transfer realogram data or panoramic images to remote locations, including store servers or other supported camera systems, and additionally receive inventory information to aid in realogram construction. In certain embodiments, realogram data is primarily stored and images are processed within the autonomous robot. Advantageously, this reduces data transfer requirements, and permits operation even when local or cloud servers are not available.

Figure 2:
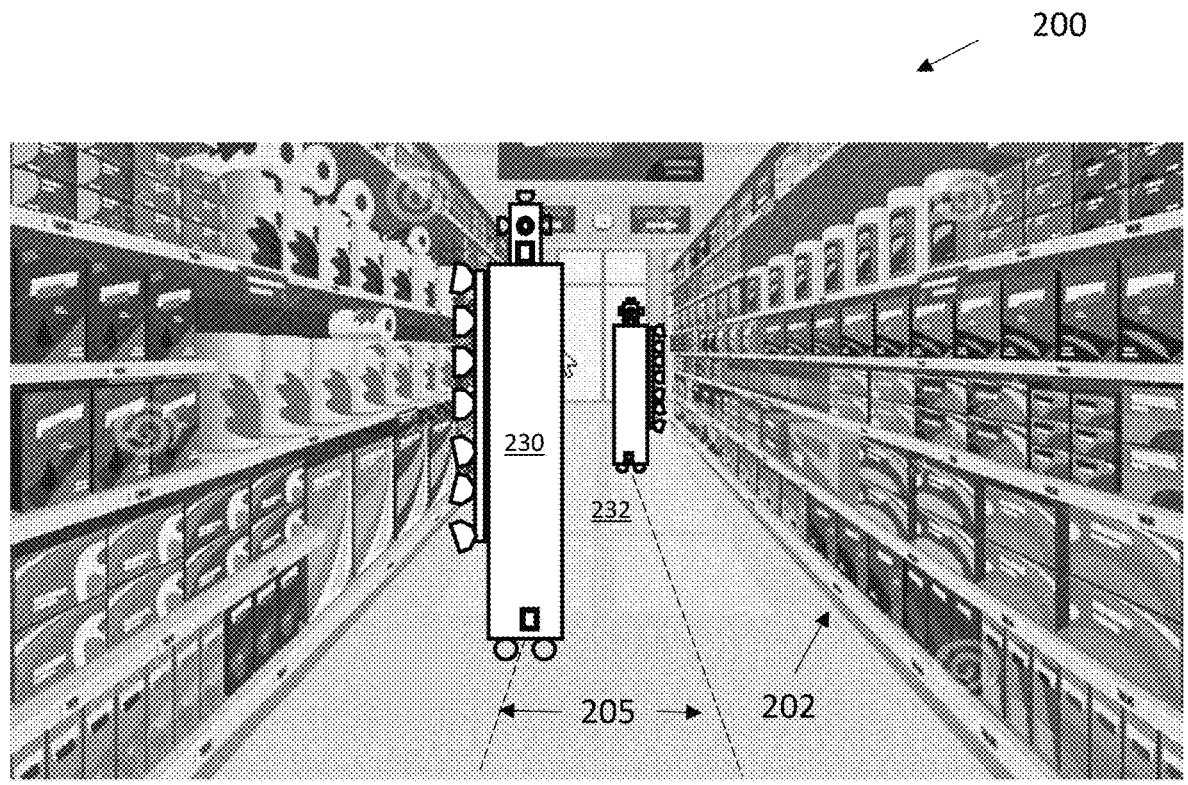
FIG. 2 is a cartoon illustrating two autonomous robots inspecting opposite shelves in an aisle.

FIG. 2 is a cartoon 200 illustrating two autonomous robots 230 and 232, similar to that discussed with respect to FIG. 1, inspecting opposite shelves 202 in an aisle. As shown each robot follows path 205 along the length of an aisle, with multiple cameras capturing images of the shelves 202.

In some embodiments, the robots 230 and 232 support at least one range finding sensor to measure distance between the multiple cameras and the shelves and products on shelves, with an accuracy of less than 5 cm, and with a typical accuracy range between about 5 cm and 1 mm. As will be appreciated, LIDAR or other range sensing instruments with similar accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 230 and 232 can move along a path generally parallel to shelves 202. As the robots move, vertically positioned cameras are synchronized to simultaneously capture images of the shelves 202. In certain embodiments, a depth map of the shelves and products is created by measuring distances from the shelf cameras to the shelves and products over the length of the shelving unit using image depth sensors and or laser ranging instrumentation. The depth map is registered onto the images captured by the shelf cameras, so as the location of each pixel on target can be estimated in 3D. Using available information, consecutive images can be stitched together to create panoramic images that spans an entire shelving unit. The consecutive images can be first stitched vertically among all the cameras, and then horizontally and incrementally stitched with each new consecutive set of vertical images as the robots 230 and 232 move along an aisle.

Figure 3:
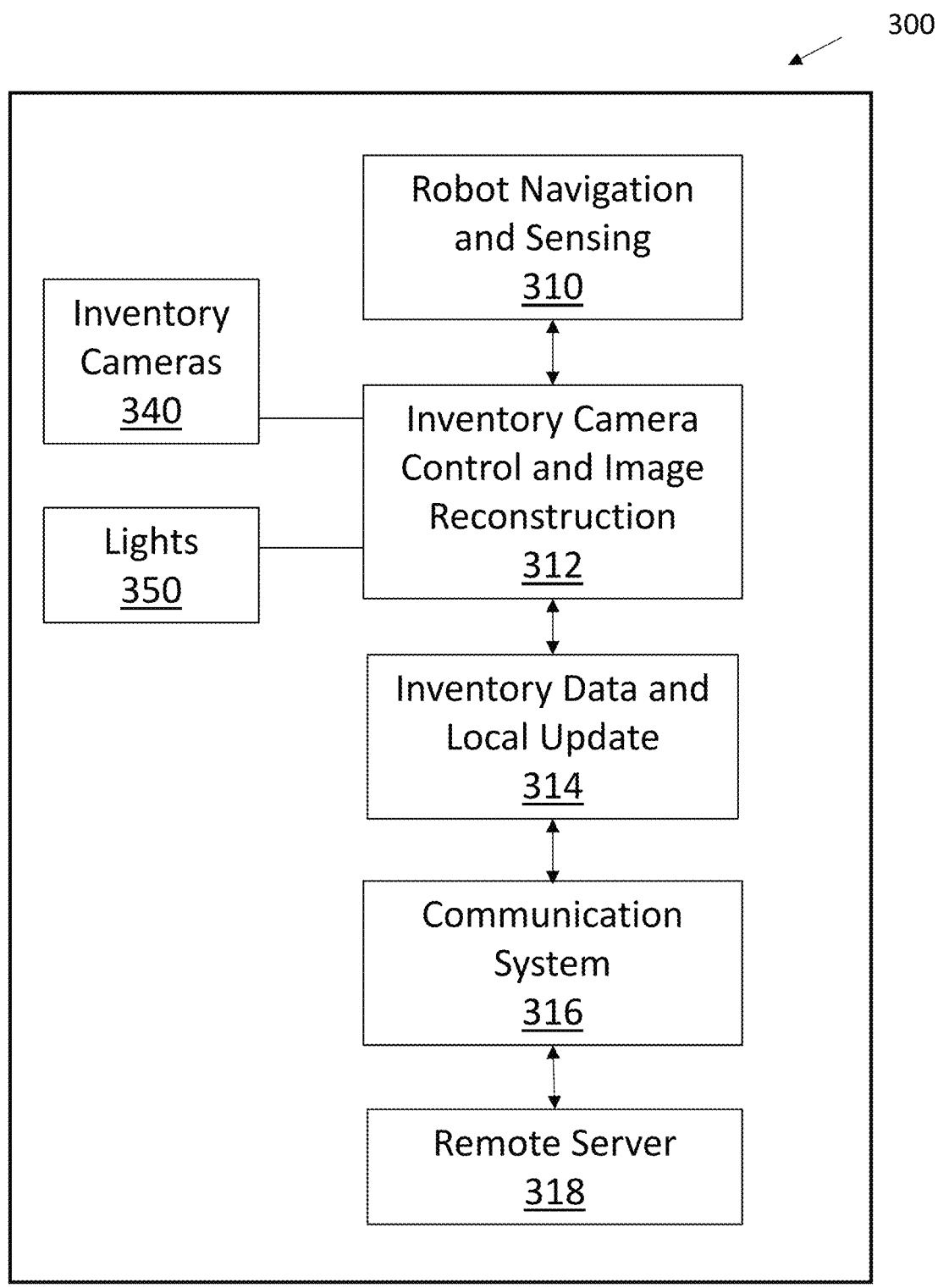
FIG. 3 is an illustration of various systems and electronic modules connected to inventory cameras.

FIG. 3 is an illustration of various systems and electronic modules 300 supported by an autonomous robot having robot navigation and sensing 310.

Inventory cameras 340 are moved into a desired position with the aid of robot navigation and sensing module 310. Lights 350 are directed toward product inventory and inventory camera control and image reconstruction 312 takes a series of inventory photos (and optional depth measurements) that can be stitched together to help form or update a realogram. Panoramic images, realogram data, or other inventory related information is handled by an inventory data and local update module 314, which can transmit or receive relevant information via communication system 316. Data can be communicated to a server local to the store, or transmitted by suitable internet or networking devices to remote servers or cloud accessible data sites.

Inventory cameras 340 can include one or more movable cameras, zoom cameras, focusable cameras, wide-field cameras, infrared cameras, ultra-violet cameras, or other specialty cameras to aid in product identification or image construction. For example, a wide-field camera can be used to create an image organizing template into which data from higher resolution cameras with a narrow field of view are mapped or registered. As another example, a tilt controllable, high resolution camera positioned on the camera support roughly at a height of a shelf lip can be used to read shelf attached bar codes, identifying numbers, or labels. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum that do not induce discomfort of health risk while reducing energy consumption and motion blur.

Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras 340 and lights 350 can be movably mounted. For example, hinged, rail, electromagnetic piston, or other suitable actuating mechanisms used to programmatically rotate, elevate, depress, oscillate, or laterally or vertically reposition cameras or lights.

In still other embodiments, one or more of the cameras can be mounted in such a way as to take advantage of the rolling shutter effects and direction of travel of the autonomous robot. Aligning a camera in such a way as to take advantage of the "rasterized" delay of the rolling shutter can reduce artifacts (elongation/shortening) that can occur while the robot is traveling in its path.

Inventory data 314 can include but is not limited to an inventory database capable of storing data on a plurality of products, each product associated with a product type, product dimensions, a product 3D model, a product image and a current product price, shelf location, shelf inventory count and number of facings. Realograms captured and created at different times can be stored, and data analysis used to improve estimates of product availability. In certain embodiments, frequency of realogram creation can be increased or reduced.

The communication system 316 can include connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Remote server 318 can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 4:
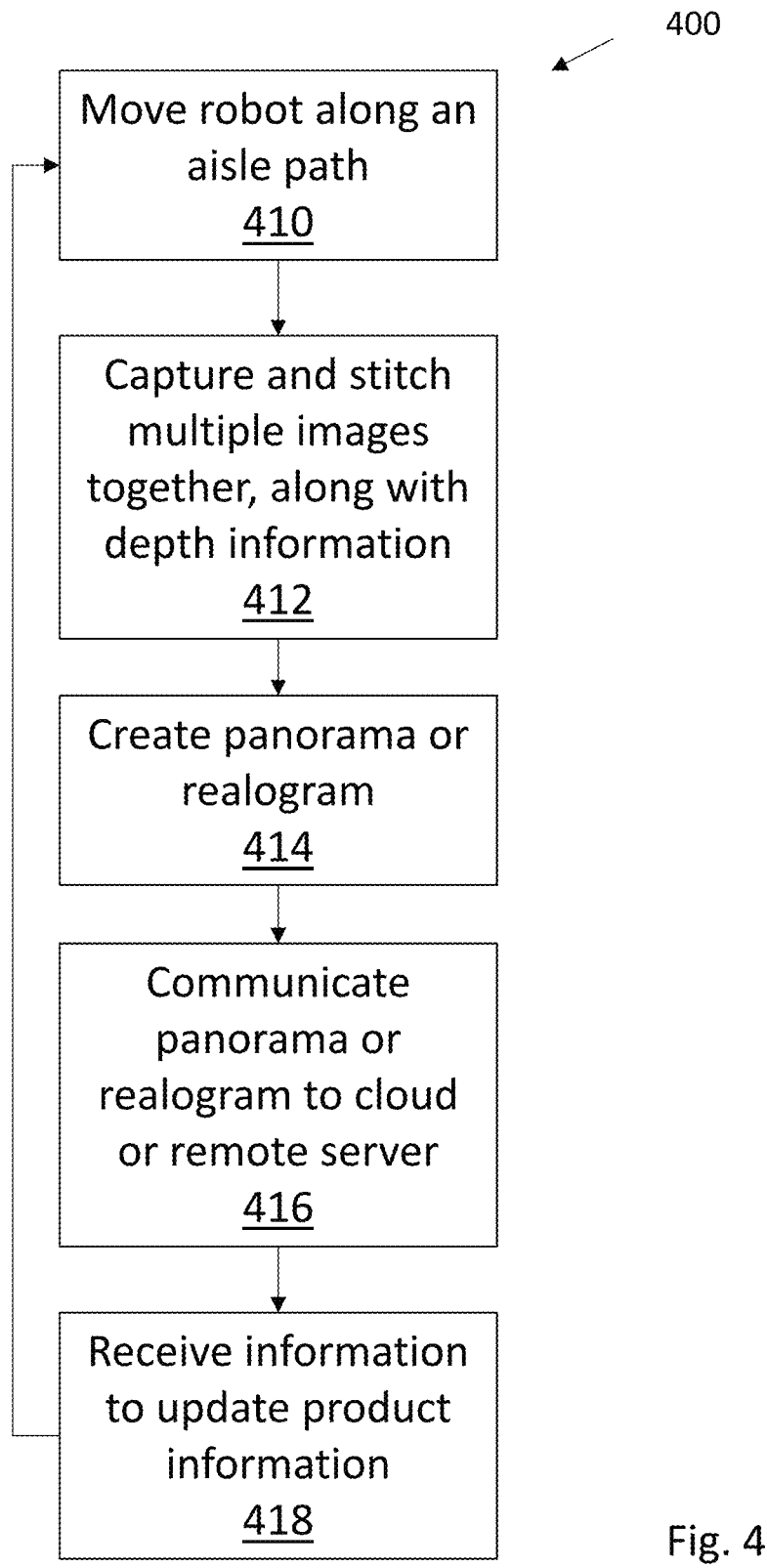
FIG. 4 is an illustration of steps in one embodiment of operation.

FIG. 4 is an illustration of realogram or panorama updating steps in one embodiment of operation. As seen in flow chart 400, a robot moves to an identified position and proceeds along an aisle path at a predetermined distance (step 410). If the path is blocked by people or objects, the robot can wait till the path is unobstructed, begin movement and slow down, wait as it nears the obstruction, move along the path until required to divert around the object before reacquiring the path, or simply select an alternative aisle.

In step 412, multiple images are captured and stitched together to define an image panorama. Optionally, in certain embodiments a panoramic or widefield camera can capture a single large image. These images, along with optional depth information created by a laser ranging system, an infrared depth sensor, or similar system capable of distinguishing depth at a decimeter or less scale, are used to create either panorama or a realogram (step 414). This information is communicated to a cloud or remote server (step 416) to create, change, or update a panorama and/or realogram with data derived from shelf labels, bar codes, and product identification databases to identify products. A realogram is created using panorama images and data, and can be used by, for example, store managers, stocking employees, or customer assistant representatives to localize product and label placement, estimate product count, count the number of product facings, or even identify or locate missing products. Additionally, in some embodiments, realogram or other information received from other robots, from updated product databases, or from other stores can be used to update or assist in the creation of subsequent realograms (step 418).

Figures 5A, 5B:
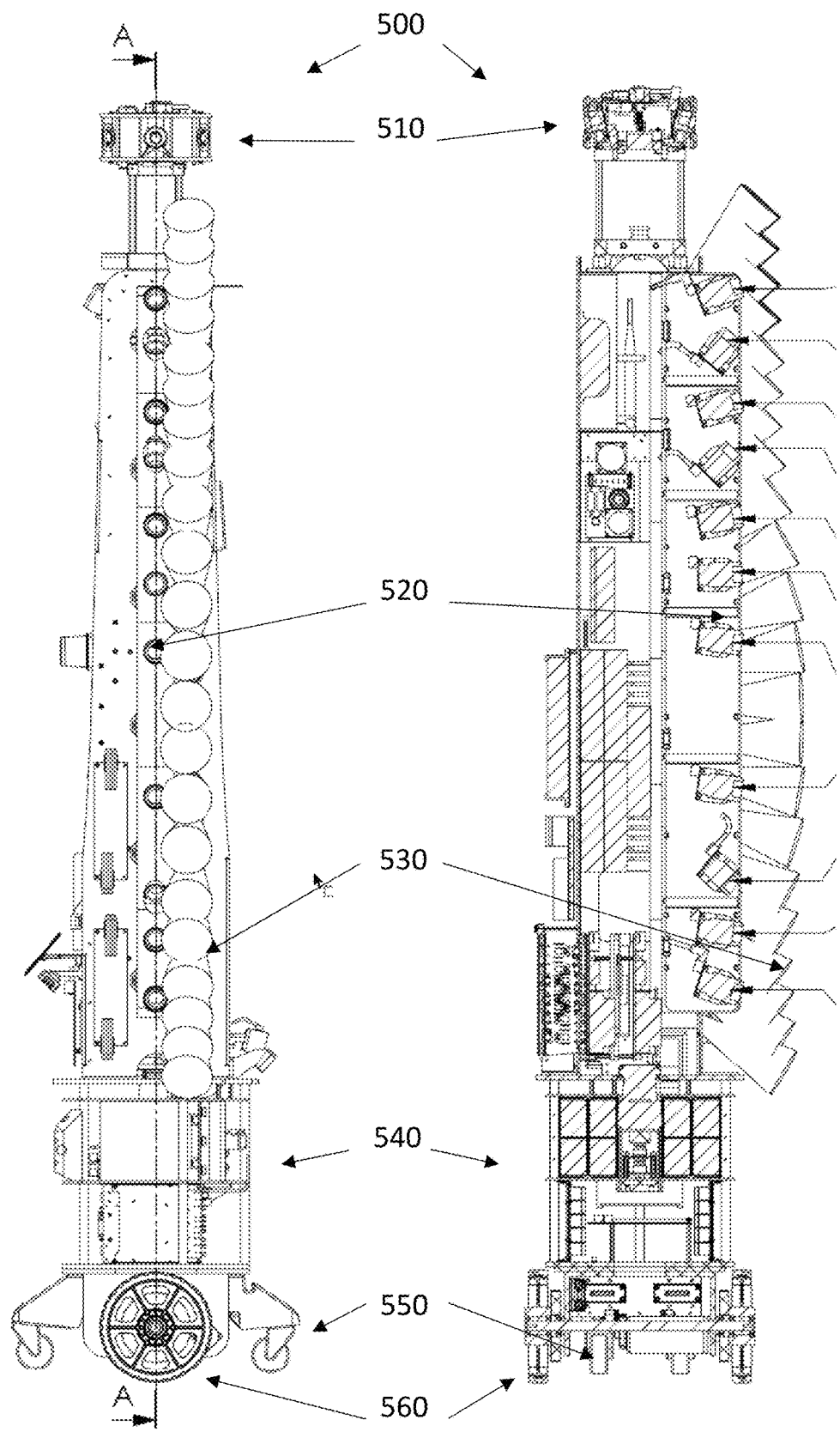
FIGS. 5A and B are respectively examples in side view and cross section of an autonomous robot capable of acting as a mobile base for a camera system.

FIGS. 5A and B are respectively examples in side view and cross section of an autonomous robot 500 capable of acting as a mobile base for a camera system in accordance with this disclosure. The robot navigation and sensing unit includes a top mount sensor module 510 with a number of forward, side, rear, and top mounted cameras. A vertically aligned array of lights 520 is sited next to a vertically arranged line of cameras 530, and both are supported by a drive base 540 that includes control electronics, power, and docking interconnects. Mobility is provided by drive wheels 560, and stability is improved by caster wheels 550.

Inventory monitoring can rely on use of autonomous robot camera system images. Typically, multiple images are processed, combined, and segmented for further analysis. Segmented images can assist in defining a product bounding box that putatively identifies a product facing. This information is often necessary to develop a product library. A segmented image can include multiple product bounding boxes, typically ranging from dozens to hundreds of outlined or distinct image areas. The bounding boxes can surround either product facings, groups of products, or gaps between products. Products within product bounding boxes can be manually identified, identified using crowd source or paid reviewer image identification systems, identified with or without the aid of an initial planogram, or automatically identified using various image classifiers discussed herein. Gaps between products are useful for identifying shelf spacings, product separation, or missing/absent inventory.

Automatic identification can be performed using an autonomous robot, alone or in combination with an external image classifier system. In certain embodiments, a product bounding box can be defined as the horizontal space on the shelf occupied by one or more copies (facings) of the same product, along with the vertical space spanning the distance between a current shelf and the shelf above it. When the current shelf is the top shelf, the vertical space is a number generally corresponding to the distance to top of the fixture. The vertical space can alternatively be top of the product as sensed by depth sensors.

Image segmentation to automatically assist in creation of product bounding boxes and product identification can rely on use of image templates in some embodiments. Typically, each image template is compared with the image captured by a camera system mounted on an autonomous robot. If a match is positive, the matched section of the image is used as the image segmentation for that product Segmentation can be improved by training classifiers on annotated training data sets, where bounding boxes are manually drawn around products. Training can be performed with supervised or unsupervised machine learning, deep learning, or hybrid machine and deep learning techniques, including but not limited to convolutional neural networks.

Some methods include reducing the number of image templates that must be considered by only matching the templates that correspond to the product identifier; or to the product objects who are proximal to the shelf location being scanned. Product objects can include but are not limited to:
   a product identifier
   One or more sets of descriptors
   Confidence levels for each set of descriptors
   One or more shelf position metric estimates
   Confidence levels for each shelf position metric estimate
   One or more shelf position topological estimates
   Count number for each shelf position topological estimate
   One or more image templates of the product
   Dimensions of the product Product objects can be updated, manually or automatically revised, augmented, or corrected, and changed to match changing product specifications.

Some methods further detect if a product is oriented differently than the externally sourced image. If a template match cannot be found, but the product descriptor does find a high-likelihood match, this is indicative of a product orientation that is different from that of the image sourced externally to the mobile base system. If the externally sourced image is known to be a front view of the product, then this method identifies products that are improperly oriented on the shelf. The angular deviation of the improperly oriented product can be estimated and an affine transformation between the set of descriptors of the externally sourced image and the segmented portion of the image computed.

For situations where template matching is successful, the product segmentation in the image can be considered accurate, and the real dimensions of the product are compared to the apparent dimensions of the product in the image to extract a distance estimate between the imaging sensor and the product. Additionally, the apparent position of the product in the image combined with the distance estimate enable the computation of the three-dimensional position and orientation between the imaging sensor and the product.

Some methods extract topological shelf positions for each product from the planogram. These methods further increase the scope of the product object identified through segmentation and redefine it as containing:
   One product identifier
   One or more sets of descriptors Confidence levels for each set of descriptors
One or more shelf position metric estimates
Confidence levels for each shelf position metric estimate
One or more shelf position topological estimates
Count number for each shelf position topological estimate
One or more image templates of the product
Dimensions of the product
One or more topological shelf positions from planogram In other embodiments, RFID tags, wireless beacons, locators, or trackers can be used alone or in combination to assist in defining a product bounding box. For example, in some embodiments, an autonomous robot can be additionally equipped with one or more RFID readers. Performing an inventory count of products equipped with RFID tags can proceed in one embodiment as follows:

The total number of tags for each product is communicated by an inventory management software to an RFID reader mounted on or associated with an autonomous robot;

The RFID reader collects RFID tags while the autonomous robot is either stationary or moving;

If the RFID reader does not collect all the tags for a given product, and:
  i) If the autonomous robot is moving, then the autonomous robot stops in an attempt to collect the remaining tags, or
  ii) If the autonomous robot is stopped, move the autonomous robot in a predetermined search path in an attempt to collect the remaining tags.

With suitable changes, Bluetooth, Near Field Communication, or other conventional wireless system can be used in place of RFID systems.

In some embodiments, visual images based on numeric, alphabetic, one or two-dimensional bar codes, or similar image based shelf or product labels can be used alone or in combination with various image features to segment images and assist in defining a product bounding box. Each shelf image can be analyzed and segmented to detect individual price tags or product labels on the shelf. Alternatively, or in addition, each image can be used to detect identifying indicia of individual products and product packages. Segmentation can use techniques that include but are not limited to:

Edge detection;
Depth estimation using depth estimation techniques that include but are not limited to:
  i. Stereo camera
  ii. Structure from motion
  iii. Structure from focus
  iv. Depth camera using time of flight
  v. Depth camera using triangulation
  vi. Planar or 3D laser/lidar scanner
Color segmentation;
Product features including but not limited to product shapes, colors, texts, and aspect ratios;
Product shapes identified and learned using machine learning techniques such as convolutional neural networks and deep learning
Association of individual product images to identifiers based on a location heuristic. The heuristic may locate the identifier below a product image or in another proximal location.

The heuristic may be informed from the planogram by correlating the planned location of labels to the measured location of labels, and the number of facings for each facing group with the measured distance between consecutive labels divided by the width of the product corresponding to the left label. These correlations can be optimized, for example by using graph theory approaches, to generate a maximum likelihood correspondence between a facing group and a label.

Association may also be informed by mapping the left most label on a shelf with the left most group of self-similar facings, the right most label on the same shelf with the right most label facing group, and working inward until every facing group has an associated label.

Further, association may be informed by classifiers trained on hand-annotated associations from training data sets and using heuristics similar to the ones described above. Some methods further include inferring the position of each identifier on the shelf by comparing the location of the identifier to the location of the beginning or end of the shelf on which the identifier is placed. Alternatively, methods can be based on inferring the position of each product on the shelf by comparing the location of the product to the location of the beginning or end of the shelf on which the product is placed.

In some methods, an identifier's shelf location and/or product location are expressed in metric terms, i.e. measured distance from the beginning or end of a specific shelf. In other methods, an identifier's shelf location and/or product location are expressed topologically, e.g. as a sequence of identifiers from the start or the end of a specific shelf, and from the bottom of a shelf to the top, or from top to bottom. For example, a specific identifier may be third from the start of the fourth shelf.

If a product library is created or made available, the library can be searched for products objects with a large number of similar features to assist in developing a product bounding box. For each potential product object match, the geometric consistency of the feature locations in the library can be compared with the features in a shelf image. Some methods further include indexing the sets of descriptor within the library for improved searching performance and/or reduced storage requirements. Indexing methods include but are not limited to: hashing techniques, tree representations, and bag-of-words encodings. Alternatively, planogram information or product location information from the product library can be used to reduce the number of products that must be searched to just those products contained within the imaged shelf. In still other variations, identified products can be verified by segmenting and decoding the price tag or product label located proximally to each identified product and comparing it to the product object identifier.

Figure 6:
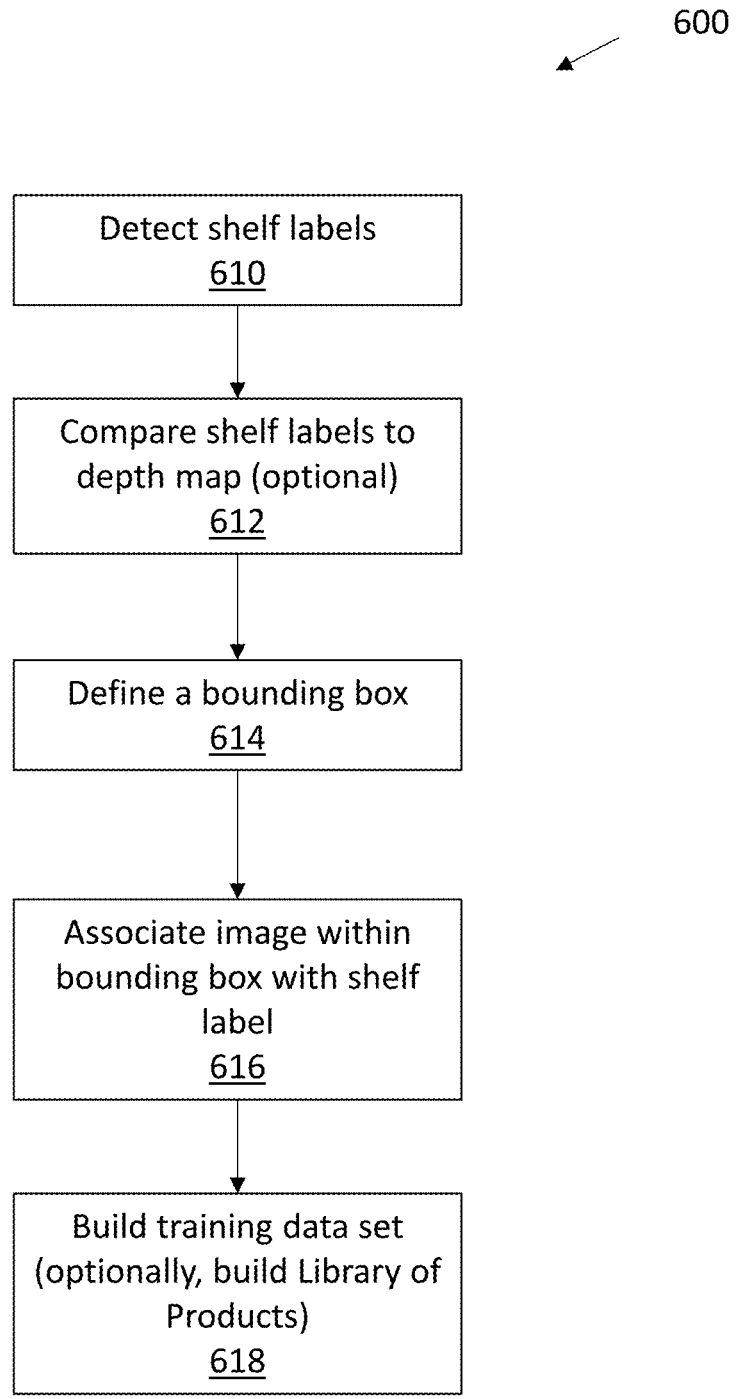
FIG. 6 is a flowchart 600 illustrating in more detail how a product space for a realogram can be created without requiring an initial planogram.

FIG. 6 is a flowchart 600 illustrating in more detail one example of how a product bounding box such as previously discussed can be created from information captured by sensor and camera system supported by an autonomous robot. Turning to FIG. 6, in a first step 610, shelf labels are detected either in individual shelf images, or in a stitched panorama. Classification algorithms such as convolution neural networks or other deep learning methods, template matching or HAAR cascades can be used to aid in detection of each shelf label. Each shelf label is analyzed to obtain one or more product identifiers. Analysis may include but is not limited to optical character recognition, bar code scanning, QR code scanning, AR code scanning, or hologram code scanning. Product identifiers may be UPC code, the product name, or a coded collection of letters, numbers, or other symbols. If more than one identifier is available, a preferred identifier such as the UPC code can be selected. In certain embodiments, infrared or ultraviolet detectable product identifiers embedded on product packaging or shelf labels can be used, as well as any other suitable tag, marker, or detectable identifying indicia such as a visible UPC code or serial number on the product packaging.

In optional step 612, an image location of the shelf label is registered or compared to a depth map to recover its 3D location in space. The depth map can be created by use of one or more depth sensors that infer depth from stereo images, project an infrared mesh overlay that allows rough determination of object distance in an image, infer depth from the time of flight of scanning lasers or LEDs reflecting off the target, or any other suitable method for building a depth map typically having sub-millimeter to sub-centimeter resolution.

In step 614 a bounding box is defined as a perimeter enclosing one or multiple facings of the same product, or any space on the shelf including but not limited a gap between products. The bounding box can be manually defined, or automatically defined using training classifiers, deep learning, image segmentation, or any other suitable technique or combination of techniques. A bounding box can be created with reference to labels grouped by height, with a horizontal distance between adjacent labels used to define the width of the bounding box for single facing products. For multiple facing products, the bounding box width is subdivided in sections equal to the product width.

The height of the bounding box can be derived from the detection of shelf heights. Shelf heights can be detected by analyzing the depth map to identify horizontal indentations corresponding to the distance between the bottom of a shelf and products stacked below it. These horizontal indentations correspond to shelf lips and measure shelf height.

Alternatively, label groups can be filtered by horizontal span (defined as the horizontal distance between the first and last label of the group) according the following criteria:
  i) A label group passes the filter if its horizontal span overlaps with the current label group span.
  ii) A label group passes the filter if its horizontal span is distant from the current label group span by no more than a number representing a bay width. Generally, bay widths are standard three or four-foot-wide shelves used throughout a store.
  iii) Order filtered label groups by height and select the label group that is next highest after the current label group.

Alternatively, shelf heights can also be detected by deep learning classifiers trained on manually annotated color and depth images (if available) of the shelves.

The height of the bounding box can be fully defined once the height difference between the selected label group and the current label group is determined.

For vertically stacked products, the height of the bounding box is subdivided in sections equal to the height of the product.

In certain embodiments, the previous method for determining the bounding box can be probabilistically combined through estimating a confidence measure for each method and adding their results.

Next, in step 616, each bounding box is consistently associated with an identifier based on a label location heuristic. The identifier can be selected to originate from either the left or the right shelf label. The association of bounding boxes and identifier can further be refined through optimization across an entire shelf section or aisle. The bounding box, with identifiers, can be registered to a simple or panoramic stitched image of the shelf, and image descriptors extracted for the portion of the image contained in the bounding box. Methods for generating image descriptors include but are not limited to: image templates, Histogram of Gradients, Histogram of Colors, the Scale Invariant Feature Transform, Binary Robust Independent Elementary Features, Maximally Stable Extremal Regions, Binary Robust Invariant Scalable Keypoints, Fast Retina Keypoints, Kaze features, and variations thereof.

An alternative to extracting product descriptors is to use the bounding boxes as labeled categories and train classifiers on the images contained in the bounding boxes. Classifiers may include those based on deep structured learning, hierarchical learning, deep machine learning, or other suitable deep learning algorithms associated with convolutional, feedforward, recurrent, or other suitable neural network. A deep learning based classifier can automatically learn image descriptors based on an annotated training data. For example, deep learning based image descriptors can be hierarchical, corresponding to multiple layers in deep convolutional neural networks. The final layer of a convolutional layer network outputs the confidence values of the product being in one of the designated image categories. The image descriptor generator part and the classification part get integrated in a convolutional neural network and these two parts are trained together using a training set.

Alternatively, or in addition, embodiments that use both deep learning based image descriptors and conventional image descriptors can be combined in a hybrid system.

In step 618, the image descriptors can be classified and labelled with the identifier. Classification algorithms that can include but are not limited to support vector machine. This process can be repeated for every image of the bounding box associated to the same identifier, whether the image is captured in the same store at different times, or in different stores. In time, this allows automatically building a product library (i.e. the "Library of Products"), without requiring an initial planogram or storage of specific product databases.

For those embodiments utilizing deep learning based image descriptors, the neural network classifier can be part of the same trained convolutional neural network. The automatically learned features, which are extracted from different layers of the convolutional neural network, can be used in a larger product recognition system. These features can be used in conjunction with other classifiers or with conventional image descriptors in a hybrid system.

Figure 7:
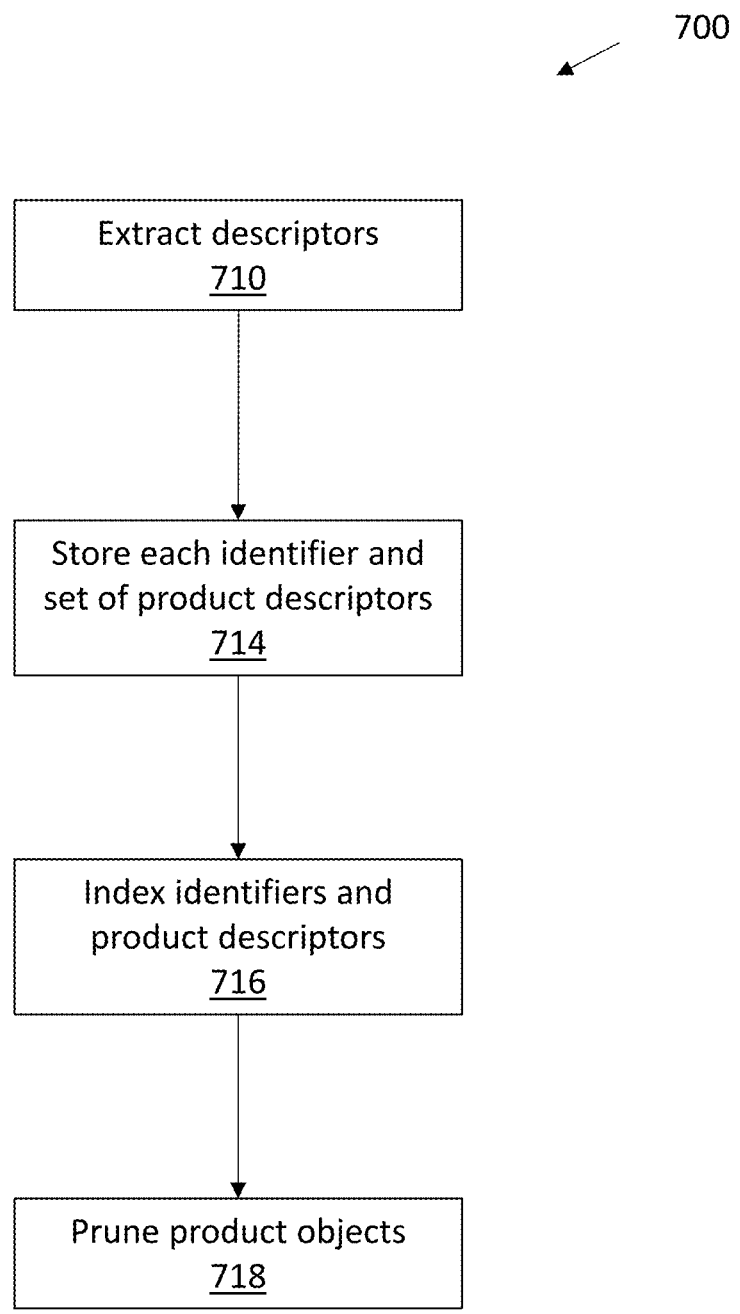
FIG. 7 is a flow chart 700 illustrating additional process details for managing aspects of the disclosed system.

FIG. 7 is a flow chart 700 illustrating additional process details for managing one embodiment of a library of products. The library of products can be stored in a single autonomous robot such as described herein, distributed between two or more autonomous robots, or stored in a local, remote, or cloud server, in whole or in part. In one embodiment, step 710 requires extraction of one set of descriptors from each product image associated to an identifier. One or more sets of descriptors can be developed, confidence levels for each set of descriptors set; dates at which each set of descriptors was generated recorded; one or more shelf position metric estimates made; confidence levels for each shelf position metric estimated; one or more shelf position topological estimated; or a count number for each shelf position topological estimated. In other embodiments, one or more image templates of the product or dimensions of the product can be used to determine product object scope.

In step 714, each identifier and set of product descriptors is stored in a database or library of product objects as follows:
  i) If the identifier does not match an existing identifier in the library, create a new object containing the identifier, the set of product descriptors, an entry confidence level for the set of product descriptors, and the date. The entry confidence level is unique.

ii) If the product's identifier matches an existing identifier in the library, compute a score for each existing set of descriptors that describes the likelihood that the new and existing sets of descriptors were extracted from the same object.

iii) If the highest likelihood score exceeds a heuristic value for a positive match: combine the new set of descriptors with the highest likelihood feature set; and increase the confidence level of this set of descriptors relative to the other sets of descriptors in the object; and append the date to that of the existing set of descriptors.

iv) If the highest likelihood score does not exceed a heuristic value for a positive match: add the set of descriptors to the object; set the confidence to the entry level; and add the date.

For those embodiments utilizing deep learning based image recognition, the input image is classified belonging to one of the product categories using convolutional neural network which outputs the confidence level. This confidence level is then used to store the image descriptors in the library in the same fashion as above.

In step 716, the descriptor sets within the library can be used for improved searching performance and/or reduced storage requirements. Indexing methods include but are not limited to: hashing techniques, tree representations, and bag-of-words encodings.

In step 718, the product library can optionally be pruned to reduce errors and database size. Pruning of sets of descriptors and metric or topological shelf positions can occur as follows:

i) Sets of descriptors: delete all sets whose confidence level is below a heuristic value, along with their confidence level and date entries, except if they originate from images sourced externally to the mobile base system.

ii) Metric shelf positions: delete all metric positions whose confidence level is below a heuristic value except if their date of entry is the last date on record, along with their confidence level and date entries iii) Topological shelf positions: delete all topological positions whose count number is below a heuristic value except if their date of entry is the last date on record, along with their count number and date entries Alternatively, pruning can involve:

iv) Sets of descriptors: delete all sets except for the set with the highest confidence level, along with their confidence level and date entries, except if they originate from images sourced externally to the mobile base system.

v) Metric shelf positions: delete all metric positions along with their confidence level and date entries, except the latest date, if its associated confidence level is higher than a heuristic value. Otherwise, keep the data from last two dates or more, until a confidence level above the heuristic value is found.

vi) Topological shelf positions: delete all topological positions along with their counter number and date entries, except the latest date, if its associated count number is higher than a heuristic value. Otherwise, keep the data from last two dates or more, until a count number above the heuristic value is found.

In some embodiments, modifying the product library can utilize external image data sources to aid in product identification. These images can be acquired from one or more of the following sources:

i) Retailer carrying the product, where the image corresponds to the product identifier ii) Manufacturer of the product, after matching the product identifier with the manufacturer's nomenclature and image iii) Third-party photography of the product iv) Online databases, image search engines, or data from online retailers of product listings, or other Internet databases. Searches are conducted preferably using the manufacturer's nomenclature that corresponds to the product identifier. In some methods, this search is performed automatically and the one or more images inserted without human intervention.

The one or more externally derived images can include at least one front view of the product, and optionally additional views, such as back, sides, top and bottom, or different packaging appearances of the product that correspond to the same identifier. If a product is oriented differently than the externally sourced image, the product descriptor can attempt to find a high-likelihood match. In some embodiments, the angular deviation between a likely product and a differently oriented product can be determined by computing an affine transformation between the set of descriptors of the externally sourced image and the available product image.

For situations where template matching is successful, and the product segmentation in the image is accurate, the real dimensions of the product can be compared to the apparent dimensions of the product in the image to extract a distance estimate between the imaging sensor and the product. Additionally, the apparent position of the product in the image combined with the distance estimate enable the computation of the three-dimensional position and orientation between the imaging sensor and the product.

In the deep learning based alternative embodiments, the product segmentation can be performed by a convolutional neural network which classifies pixels as belonging to product interior and product background. The product dimensions are inferred from the segmentation.

While the described embodiments can be utilized without need of an initial planogram or substantial human assistance, in certain situations overall accuracy of inventory monitoring can be improved by use of earlier prepared planograms and manual categorization or identification of products.

Manual categorization or identification of products can include but is not limited to manual creation of bounding boxes, category level identifications (e.g. identify as a "cereal box" rather than particular product, partial identifications, or identification as one of several possible products. Even partial identifications can alleviate problems associated with incorrectly segmented product images; associations that fail the location heuristic; association ambiguity when more than one product image fit the heuristic; or absence of readable price tags or product labels. Product images that fail to be automatically segmented, disambiguated, or associated to an identifier can be catalogued and presented to humans for manual segmentation, identification, and association.

In some embodiments, a previously prepared planogram is used to facilitate and/or confirm the accuracy of product segmentation. The planogram specifies the number of facings for each product, i.e. how many copies of a product are aligned side by side on a particular shelf; the width of each facing; and optionally the intended shelf position of each facing or group of facings. This information facilitates efficient and accurate product segmentation by accounting for products with more than one facing, since only the first facing needs to be segmented by one or more of the methods described above. The remaining facings repeat the same segmentation, which accelerates the product detection process. If the number of sequential segmentation for a product does not match the number of facings, then either an error in segmentation is indicated (which can be manually corrected); one or more of the facings is either missing or added; or the number of facings is optimized across multiple labels spanning an entire shelf or even an entire aisle using optimization algorithms such as maximum likelihood.

i) In other embodiments, previously prepared planograms and/or product libraries or product databases or previously seen products at the same location can be used to improve efficiency. For example, a library of product objects can be used to improve the identification of products on the shelf, missing products, and misplaced products.

ii) In addition to identifying products on the shelves by a first method that segments images to extract product images and identifiers and associate ones to the others; or performing a second method involving template matching without product segmentation; a third method using vision-based product recognition by extracting features descriptors can be used alone or in addition to other methods improve the overall accuracy of product identification. In situations where the first method or second methods fail to return results that meet a minimum level of confidence, the third method can utilize vision-based product recognition to extract features descriptors from image scans, and match them with sets of descriptors stored in the library's product objects. The matching can be performed through an exhaustive search, or preferably by restricting the search field to the product objects whose location is noted or established to be proximal to the image scan. The location can be inferred from metric or topological position estimates of the image scan.

A positive match alleviates the problems of:
a missing price tag or product label;
a product that fails the distance heuristic;
ambiguity where two products meet the heuristics of a single identifier; and
segmentation errors.

A fourth method utilizing deep learning can be used. For example, product classifiers may include those based on deep structured learning, hierarchical learning, deep machine learning, or other suitable deep learning algorithms associated with convolutional, feedforward, recurrent, or another suitable neural network. A deep learning based classifier can automatically learn and update the product recognition system.

i) In certain embodiments, maintaining a product library requires the ability to identify a missing product. A first method for recognizing a missing product includes recognizing a location on the shelf where there is a void caused by a missing product that should have been located proximally to its identifier. The void can be detected with one or more of the following techniques:

Recognize the color, brightness or patterns of the back of the shelf or of the void;

Detect light signature or brightness differences between the current shelf image and a previous shelf image taken at the same location; and Capture the 3D model or spatial positioning of the neighboring products using one or more of the depth estimation techniques described above; and Detection by a classifier trained on gaps found in images and/or depth data i) A second method for recognizing a missing product, complementary to the first methods, includes use of a set of descriptors in the library of product objects to detect a missing product as follows:

For each identifier, match the set of descriptors from the corresponding product object to the image that fits the location heuristic proximal to the identifier; and Note a lack of identification as an indication of a missing product, or a product that is mis-oriented.

i) A third complementary method uses topological information in the library of product objects to detect a missing price tag or product label as follows:

As the mobile base scans the shelf, estimate the topological location of each identifier, where the topological location is the sequence of the product on the shelf; and Compare the estimated topological location to that stored in the library, or to that from the planogram, also stored in the library; a mismatch indicates a missing product, and the identifier of the missing product should be in the object whose topological location immediately precedes the mismatched identifier. This identifies the missing price tag or product label.

i) A fourth complementary method uses metric information in the library of product objects to detect a missing product and a missing price tag or product label as follows:

As the mobile base scans the shelf, estimate the metric location of an area of interest in the image.

Match the sets of descriptors from the library that correspond to the estimated location to the area of interest in the image.

A match is an identification of a product

A mismatch is an indication of a missing or mis-oriented product i) A fifth method involves calculating differences between the current image and a previous image taken at the same location.

ii) Still other methods can utilize a compilation of a list of identifiers of all missing products and/or their shelf position.

iii) To identify products that are misplaced, one method first matches low confidence level sets of descriptors to high confidence level descriptors of all other identifiers. If there is a match, then the matching identifier is misplaced. Periodically high-confidence level sets of descriptors in the library can be matched to areas of the images that are along shelves and that have not been successfully segmented into product images. If there is a match, then the matching identifier is misplaced.

iv) Still other methods further consist of compiling a list of misplaced items and their location.

v) Depleted or reduced stock levels can correspond or be related to product depth on shelf. Depleted stock levels can be identified through various methods. Some methods include measuring the depth of each product facing, i.e. the distance between the front edge of the shelf and the products closest to that edge, or the distance between a line passing through at least two front-most products and individual products. Techniques for sensing the depth of products and/or shelf edges include but are not limited:

Capturing the 3D model or spatial positioning of products and shelf edges from structure from motion;

Capturing the 3D model or spatial positioning of products and shelf edges from depth from focus;

Capturing the 3D model or spatial positioning of products and shelf edges using one or more of the depth estimation techniques described above; and Estimating depth by comparing product dimensions to the apparent dimensions of the segmented product image.

i) Certain methods use depth measurements to detect products who have depleted stock. Depleted stock typically happens when the front-most facing of a column of product is picked up from the shelf. The second product in the column becomes front facing, but positioned deeper than other product columns where the front-facing product has not been picked up. These methods detect stock depletion by detecting front facing products that are deeper than the front edge of the shelf and/or a line passing through at least two front-most products, where the depth is greater than a heuristic value.

ii) Some methods further define the heuristic value as the thickness of the product, while other methods further quantify the number of picked up products from a depleted column by dividing the depth by the thickness of the product, and rounding down to the closest integer. Some embodiments further compile a list of identifiers that correspond to depleted product columns and/or the number of products that have been picked up.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method, comprising:
providing a planogram with identified products;
creating a panoramic image spanning a shelving unit with possible products being surrounded by bounding boxes, including:
accessing a first plurality of images of the shelving unit captured from a vertical arrangement of a plurality of cameras in a first position;
vertically stitching together the first plurality of images into first vertically stitched images;
accessing a second plurality of images of the shelving unit captured from the vertical arrangement of the plurality of cameras in a second position, the second position differing in a horizontal dimension relative to the first position;
vertically stitching together the second plurality of images into second vertically stitched images;
horizontally stitching together the first vertically stitched images and the second vertically stitched images into the panoramic image; and
deriving bounding boxes around the possible products within the panoramic image and deriving bounding boxes around gaps between the possible products within the panoramic image;
detecting and reading shelving unit shelf labels to localize and associate possible products with both the planogram and the possible products and gaps in the bounding boxes; and
identifying the possible products.

2. The method of claim 1, further comprising segmenting the first plurality of images to extract product images and identifiers from the first plurality of images.

3. The method of claim 1, further comprising template matching possible products in the bounding boxes without product segmentation.

4. The method of claim 1, further comprising using vision based product recognition to extract features descriptors for comparison with possible products in the bounding boxes.

5. The method of claim 1, further comprising using a deep learning method to build classifiers that identify possible products as products and identify the gaps.

6. The method of claim 1, further comprising instructing an autonomous robot to move in the horizontal dimension beside the shelving unit, with the autonomous robot acting as a movable base capable of both autonomously detecting and reading shelf labels and creating the panoramic image.

7. The method of claim 1, further comprising instructing an autonomous robot to move in the horizontal dimension beside the shelving unit, with the autonomous robot acting as a movable base to capture a depth map of the shelving unit and of products positioned on the shelving unit using 3D cameras or structure from motion and multiple cameras.

8. The method of claim 1, further comprising using manual input to identify possible products designated in the bounding boxes.

9. The method of claim 1, further comprising identifying stock depletion level for a product in a bounding box.

10. An inventory system comprising:
a planogram with identified products;
an autonomous robot including a vertical arrangement of a plurality of cameras, the autonomous robot able to capture a panoramic image spanning a shelving unit, with possible products being surrounded by bounding boxes, including:
accessing a first plurality of images of the shelving unit captured from the vertical arrangement of the plurality of cameras in a first position;
vertically stitching together the first plurality of images into first vertically stitched images;
accessing a second plurality of images of the shelving unit captured from the vertical arrangement of the plurality of cameras in a second position, the second position differing in a horizontal dimension relative to the first position;
vertically stitching together the second plurality of images into second vertically stitched images;
horizontally stitching together the first vertically stitched images and the second vertically stitched images into the panoramic image; and
deriving bounding boxes around the possible products within the panoramic image and deriving bounding boxes around gaps between the possible products within the panoramic image;
a shelf label detector and reader attached to the autonomous robot and able to localize and associate possible products with both the planogram and the possible products and gaps in the bounding boxes; and
a product classifier to use information from the planogram and the possible products in the bounding boxes to identify products in the panoramic image.

11. The inventory system of claim 10, further comprising an image segmentation system able to extract product images and identifiers and associate them with the planogram.

12. The inventory system of claim 10, further comprising a template matching system to match possible products in the bounding boxes without product segmentation.

13. The inventory system of claim 10, further comprising a system for vision based product recognition to extract features descriptors for comparison with possible products in the bounding boxes.

14. The inventory system of claim 10, further comprising a deep learning system to build classifiers that identify products.

15. A computer system, the computer system comprising:
a processor;
system memory coupled to the processor and storing instructions configured to cause the processor to:
provide a planogram with identified products;
create a panoramic image spanning a shelving unit with possible products being surrounded by bounding boxes, including:
access a first plurality of images of the shelving unit captured from a vertical arrangement of a plurality of cameras in a first position;
vertically stitching together the first plurality of images into first vertically stitched images;
access a second plurality of images of the shelving unit captured from the vertical arrangement of the plurality of cameras in a second position, the second position differing in a horizontal dimension relative to the first position;
vertically stitch together the second plurality of images into second vertically stitched images;
horizontally stitch together the first vertically stitched images and the second vertically stitched images into the panoramic image; and
derive bounding boxes around the possible products within the panoramic image and deriving bounding boxes around gaps between the possible products within the panoramic image;
detect and read shelving unit shelf labels to localize and associate possible products with both the planogram and the possible products and gaps in the bounding boxes; and
identify the possible products with a product classifier.

16. The computer system of claim 15, further comprising instructions configured to use manual input to identify possible products designated in the bounding boxes.

17. The computer system of claim 15, further comprising instructions configured to identify stock depletion level for a product in a bounding box.

* * * * *